J. J. FREEMAN.
LINKS FOR ORNAMENTAL CHAINS.

No. 189,619. Patented April 17, 1877.

WITNESSES: INVENTOR:

UNITED STATES PATENT OFFICE.

JOSEPH J. FREEMAN, OF ATTLEBOROUGH, MASSACHUSETTS, ASSIGNOR TO FREEMAN & CO., OF SAME PLACE.

IMPROVEMENT IN LINKS FOR ORNAMENTAL CHAINS.

Specification forming part of Letters Patent No. 189,619, dated April 17, 1877; application filed February 10, 1877.

*To all whom it may concern:*

Be it known that I, JOSEPH J. FREEMAN, of Attleborough, in the State of Massachusetts, have invented an Improved Link for Ornamental Chains, which is designed to be an improvement on the patent granted me March 11, 1873, and numbered 136,594, of which the following is a specification:

The nature of my invention consists in an improved chain-link, formed of wire bent around a suitable form, and then having its ends turned inwardly, forming two loops, by means of which any desired number of such links may be readily grouped into a strong and durable ornamental chain for jewelry, without the employment of solder.

Figure 1:
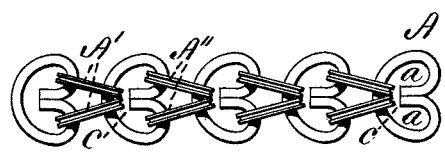
Figure 2:
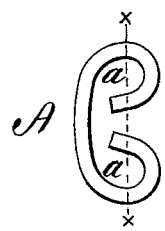
Figure 3:

Figure 1 represents a piece of the chain, showing the method of grouping the links with each other. Fig. 2 is a side view of a single link. Fig. 3 is a sectional view taken in the line $x\ x$.

The wire used to form the link A is first bent around a circular form, and then the ends are turned inwardly or toward each other, so as to form the loops $a\ a$, Fig. 2, leaving a space between the two ends of the wire, and between the ends of the wire and the inner curved surface of the link, sufficient for the insertion of the wire of another link within the loops.

In putting the chain together two links are caught at a time—one in each loop—and then the link is squeezed, so as to cause the ends of the wire to touch each other, as shown in Fig. 1; and this operation is repeated with other links until the chain is completely formed. It is then drawn through a smooth hole in a plate, in order to reduce the links to a uniform size.

The space C between the ends of the wire and the inner surface of the link is made so that, when occupied by the links A' A', the links A'' A'' cannot pass from one loop into the other, thus allowing the chain to become disorganized.

This improved link, when made of grooved wire, forms up into a chain in close imitation to the celebrated "Geneva chain," the construction of which is attended with expensive soldering. Either square, flat, or round wire will also produce desirable effects.

I claim as my invention—

The chain-link A, formed of wire, bent around, as shown, and having its ends turned inwardly, so as to form the two loops $a\ a$, and leaving a space, C, between the ends of the wire and the inner surface of the link, sufficient to receive but one thickness of the wire at a time, substantially as described.

JOSEPH J. FREEMAN.

Witnesses:
SOCRATES SCHOLFIELD,
ALBA R. ABBOTT.